őső
United States Patent
Phinney

(12) United States Patent
(10) Patent No.: US 6,475,458 B1
(45) Date of Patent: Nov. 5, 2002

(54) METHOD FOR FORMULATING FOOD GRADE SODIUM BICARBONATE

(75) Inventor: Robin Phinney, Calgary (CA)

(73) Assignee: Airborne Industrial Minerals Inc., Calgary (CA)

(*) Notice: Subject to any disclaimer, the term of this patent is extended or adjusted under 35 U.S.C. 154(b) by 0 days.

(21) Appl. No.: 09/425,968

(22) Filed: Oct. 25, 1999

(51) Int. Cl.[7] .............................. C01D 7/00; C01D 7/22
(52) U.S. Cl. ...................... 423/422; 423/184; 423/186; 423/206.1; 423/DIG. 14; 23/302 T
(58) Field of Search ................................. 423/422, 423, 423/181, DIG. 14, 184, 186, 189, 206.1, 209; 23/302 T

(56) References Cited

U.S. PATENT DOCUMENTS

| | | | |
|---|---|---|---|
| 3,206,297 A | 9/1965 | O'connor | 71/28 |
| 3,423,171 A | 1/1969 | Hoppe et al. | 23/121 |
| 3,493,329 A | 2/1970 | Stiers et al. | 23/63 |
| 3,553,100 A | 1/1971 | Jorda et al. | 208/11 |
| 3,728,438 A | 4/1973 | Nasyrov | 423/551 |
| 3,935,098 A * | 1/1976 | Oda et al. | 210/38 |
| 4,371,512 A | 2/1983 | Sardisco et al. | 423/551 |
| 4,385,920 A | 5/1983 | Dancy et al. | 71/36 |
| 4,702,805 A * | 10/1987 | Burkell et al. | 204/95 |
| 5,562,890 A | 10/1996 | Woode | 423/427 |
| 5,588,713 A | 12/1996 | Stevenson | 299/5 |
| 5,654,351 A | 8/1997 | Kresnyak et al. | 423/423 |
| 5,783,159 A * | 7/1998 | Aldinger | 423/179 |
| 5,830,422 A | 11/1998 | Kresnyak et al. | 423/243.08 |

FOREIGN PATENT DOCUMENTS

| | | | |
|---|---|---|---|
| WO | WO 93/11071 * | 6/1993 | 423/186 |
| WO | WO 97/00829 A | 1/1997 | C01D/7/18 |
| WO | WO 97/11907 | 4/1997 | C01D/7/26 |
| WO | WO 00/21887 | 4/2000 | C01D/7/02 |

OTHER PUBLICATIONS

Perry et al. *Chemical Engineers'Handbook* 5th Ed. McGraw–Hill Book Co. USA, ISBN 0–07–049478–9, p. 16–3, 1973.*
Patent Abstracts of Japan, vol. 011, No. 259 (C–441), Aug. 21, 1987 For JP 62 059525 A (Tokuyama Soda Co. Ltd.), Mar. 16, 1987, abstract.
Patent Abstracts of Japan, vol. 015, No. 133 (C–0820), Apr. 2, 1991, For JP 03 016913 A (Central Glass Co. Ltd.), Jan. 24, 1991, abstract.

* cited by examiner

*Primary Examiner*—Stanley Silverman
*Assistant Examiner*—Timothy C. Vanoy
(74) *Attorney, Agent, or Firm*—Paul Sharpe; Ogilvy Renault

(57) ABSTRACT

There is disclosed a method for formulating food grade sodium bicarbonate by purification of a sodium bicarbonate liquor where an initial saturated feedstock of sodium bicarbonate which contains sodium sulfate as an impurity is filtered to remove the impurities and a first filtrate liquor formed. The filtrate liquor is then subjected to ion exchange with a cationic resin to reduce the calcium and magnesium ion concentration present in the filtrate liquor with subsequent cooling of the liquor. The cooled liquor is also treated with a source of ammonia or ammonium ions to shift the solubility of the compounds to retain sodium sulfate in solution while precipitating sodium bicarbonate with reduced sulfate occlusions. The precipitated sodium bicarbonate is then filtered to result in a food grade sodium bicarbonate product.

18 Claims, 1 Drawing Sheet

METHOD FOR FORMULATING FOOD GRADE SODIUM BICARBONATE

FIELD OF THE INVENTION

The present invention relates to a method for formulating food grade sodium bicarbonate and more particularly, the present invention relates to a method for formulating food grade sodium bicarbonate by ion exchange purification of sodium bicarbonate.

BACKGROUND OF THE INVENTION

In the synthesis of food grade sodium bicarbonate, soda ash is typically treated with carbon dioxide or purified from product formed in the Solvay process. In order to formulate food grade sodium bicarbonate, the compound must be purified to leave a product having less than 100 ppm impurities. The prior art has addressed this need in many ways, however, the methods include the use of several unit operations, expensive equipment, high energy input among other factors all contributing to the cost of processing.

It would be desirable if a method existed, where the product could be prepared without the limitations of the prior art. The present methodology proposes a solution to the existing methods.

SUMMARY OF THE INVENTION

One object of the present invention is to provide an improved method for formulating food grade sodium bicarbonate.

A further object of one embodiment of the present invention is to provide a method for formulating food grade sodium bicarbonate by purification, comprising the steps of:

a) providing a saturated feedstock of sodium bicarbonate, the sodium bicarbonate containing at least sodium sulfate as an impurity;

b) filtering the saturated feedstock to remove impurities to form a first filtrate;

c) passing the filtrate through an ion exchanger containing a chelating cationic resin to reduce calcium and magnesium ion concentration present in the filtrate;

d) cooling the filtrate while introducing a source of ammonia or ammonium ions and carbon dioxide to retain ammonium sulfate in the filtrate and precipitating sodium bicarbonate; and e) filtering precipitated sodium bicarbonate.

The processes as discussed herein offer a straightforward method of purifying sodium bicarbonate to the food grade standard using ion exchange solubility shifting with reduced levels of energy.

As a further object of one embodiment of the present invention, there is provided a method for formulating food grade sodium bicarbonate by purification, comprising the steps of:

a) providing a saturated feedstock of sodium bicarbonate, the sodium bicarbonate containing at least sodium sulfate, calcium and magnesium as an impurities;

b) filtering the saturated feedstock to remove impurities to form a first filtrate;

c) passing the filtrate through an ion exchanger containing a chelating cationic resin to reduce calcium and magnesium ion concentration present in the filtrate to less than 10 parts per million;

d) cooling the filtrate while introducing a source of ammonia or ammonium ions and carbon dioxide to retain ammonium sulfate in the filtrate and precipitating sodium bicarbonate; and e) filtering precipitated sodium bicarbonate.

By making use of the ion exchangers and solubility shifting, the liquor is progressively purified without risking the introduction of additional impurities to the liquor. Further, since the processes do not require high temperatures, there is no concern with the sodium bicarbonate being converted to sodium carbonate. This typically occurs at approximately 100° C. With the use of the ion exchangers and the recognition of solubility shifting, high temperature unit operations are avoided, product yield is high and impurity concentration is reduced to an acceptable level.

Having thus described the invention, reference will now be made to the accompanying drawing illustrating preferred embodiments.

DETAILED DESCRIPTION OF THE PREFERRED EMBODIMENTS

Figure 1:
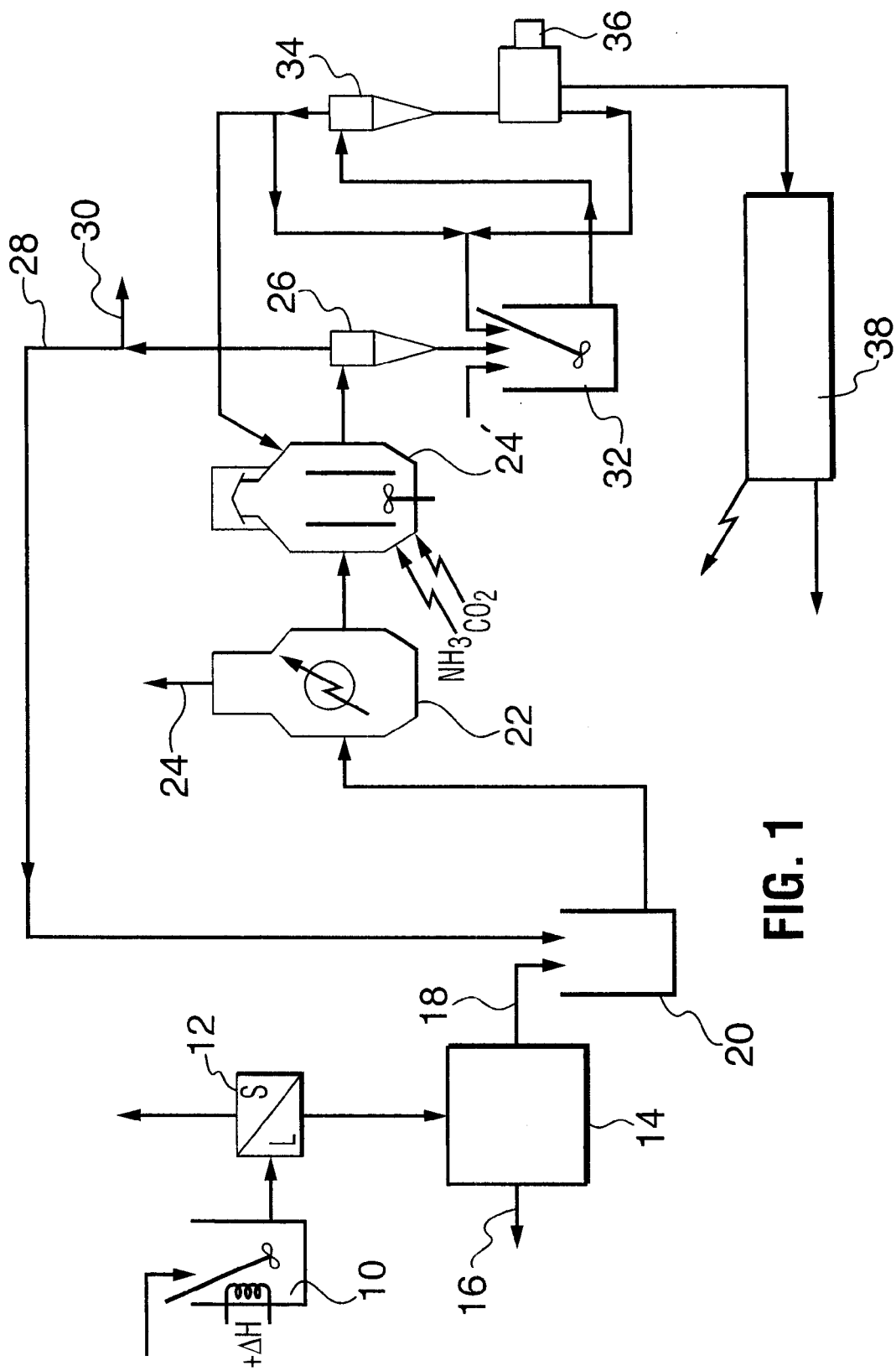
FIG. 1 illustrates a schematic representation of the method according to one embodiment of the present invention.

Referring now to FIG. 1, shown is an overall schematic representation of the process according to one embodiment.

In the embodiment shown, sodium bicarbonate having a purity of 98%, which may be contaminated with color impurities, sulfates, sodium sulfate in a range of between 0% by weight and 5% by weight, chlorides, calcium, magnesium, silicon, iron inter alia and is therefore unsuitable as food grade, is dissolved in a vessel 10 containing deionized water at a temperature of between 90° C. and 100° C. to the point of saturation. Typically, 15% by weight is added with saturation approximating 20% by weight. The liquor is filtered using activated carbon filter 12 containing carbon in a size range of between 80 mesh and 300 mesh. Alternatively, an activated carbon leaf filter may be employed. This step ensures the removal of insolubles, residual organics and any color impurities. The latter are discarded; the filtrate is treated with a series of ion exchange steps for further purification.

Referring now to the ion exchange steps, the filtrate from filter 12 is passed into an ion exchange column 14, containing sodium cations. The resin is useful to remove calcium and magnesium ion concentrations to less than 10 ppm. The typical values approximate 1 ppm. The resin may be regenerated by passage at 16 on to known arrangements for regeneration purposes.

Once the solution exits column 14 at 18, it is passed via line 18 into a surge tank 20 and subsequently into evaporator 22 where ammonium and water are recovered at 24. The solution is then treated in crystallizer 24 to which is added a source of ammonium ions and carbon dioxide. Use of ammonium bicarbonate may be employed. By making use of the source of ammonium, the result is that the sodium sulfate present as a contaminant is reacted with it to produce ammonium sulfate in solution. This facilitates the precipitation of sodium bicarbonate having significantly reduced sulfate occlusions. In effect, the presence of the ammonium bicarbonate shifts the solubility of the system, such that sodium sulfate remains in solution and does not precipitate with the sodium bicarbonate. The temperature of crystallizer 24 may be kept in the range of between 30° C. and 70° C. and desirably 40° C. The sodium bicarbonate crystals are grown in a size distribution of −28 mesh and 150 mesh with 60% of the product being in the 60 mesh size distribution. The crystals are collected in a cyclone 26 with overflow being recycled via line 28 to tank 20 and subsequently evaporator 22. A sulfate ion bleed may be present at 30.

The crystals from cyclone 26 are passed into a repulp tank 32, a further cyclone 34 and washed at 36. Materials are recycled where indicated and the wash water or repulp vessel may contain approximately 1% ammonium bicarbonate. With adequate retention time, typically 60 minutes at a temperature of between 25° C. and 50° C. and most desirably 40° C., any residual sulfate ions remain in the ammonium sulfate form. The slurry is then cycloned and centrifuged.

The product may then be dried in drier 38 with evolved ammonia and water recovered. The dryer 38 is maintained a temperature of between 60° C. and 80° C. to prevent calcination of sodium bicarbonate to sodium carbonate and releases ammonium bicarbonate to the dryer exit gas.

Product analysis revealed less than 20 ppm Cl, less than 56 ppm $SO_4$, less than 20 ppm Ca and less than 20 ppm Mg. These amounts are well within the requisite maximum quantities for food grade sodium bicarbonate.

The present technology, therefore, solves one of the most difficult problems associated with food grade sodium bicarbonate, namely the reduction of sulfate occlusions. The methodology herein provides an expeditious procedure without complicated unit operations and high energy input to formulate food grade sodium bicarbonate.

It is known in the bicarbonate synthesis field that the occlusion rate for sulfate in crystal is 800 ppm, which is significantly over that which is acceptable in food grade. The present technology satisfies the need for reduced occlusion which was previously not possible in the art.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. A method for formulating food grade sodium bicarbonate from a saturated feedstock of sodium bicarbonate containing sodium sulfate and chloride ions as impurities, comprising the steps of:
    a) decontaminating said feedstock by filtering said saturated feedstock to remove impurities to form a first filtrate liquor;
    b) passing said filtrate liquor through an ion exchanger containing a chelating cationic resin to reduce calcium and magnesium ion concentration present in said filtrate liquor to less than 10 ppm;
    c) reducing sulfate occlusions in said filtrate-by treating said filtrate liquor with a source of ammonia or ammonium ions to shift the solubility of the compounds present to retain sodium sulfate in solution while precipitating sodium bicarbonate; and
    d) filtering precipitated sodium bicarbonate whereby said sodium bicarbonate has an impurity level sufficiently low to comprise food grade.

2. The method as set forth in claim 1, wherein said saturated feedstock of sodium bicarbonate comprises between 15% by weight sodium bicarbonate to saturation.

3. A The method as set forth in claim 2, wherein said saturated feedstock of sodium bicarbonate contains at least one of magnesium, calcium, sulfate, silicon, iron, and residual organic materials.

4. The method as set forth in claim 3, wherein said solution is filtered through activated carbon to remove said at least one of magnesium, calcium, sulfate, silicon, iron and residual organic materials.

5. The method as set forth in claim 1, wherein said source of ammonia or ammonium ions comprises ammonium bicarbonate.

6. The method as set forth in claim 1, wherein said chelating cationic resin comprises sodium resin for removing calcium and magnesium.

7. The method as set forth in claim 1, wherein said precipitated sodium bicarbonate is in a size distribution of between −28 mesh and 150 mesh.

8. The method as set forth in claim 7, further including the step of washing said precipitated sodium bicarbonate.

9. A method for formulating food grade sodium bicarbonate from a saturated feedstock of sodium bicarbonate, containing sodium sulfate, calcium, magnesium and chloride ions as impurities, comprising the steps of:
    a) decontaminating said feedstock by filtering said saturated feedstock to remove said impurities to form a first filtrate liquor;
    b passing said filtrate liquor through an ion exchanger containing a chelating cationic resin to reduce calcium and magnesium ion concentration present in said filtrate liquor to less than 10 parts per million;
    c) reducing sulfate occlusions in said filtrate by treating said filtrate liquor with a source of ammonia or ammonium ions to shift the solubility of the compounds present to retain sodium sulfate in solution while precipitating sodium bicarbonate; and
    d) filtering precipitated sodium bicarbonate whereby said sodium bicarbonate has an impurity level sufficiently low to comprise food grade.

10. The method as set forth in claim 9, further including the step of washing said precipitated sodium bicarbonate.

11. The method as set forth in claim 10, further including the step of drying washed sodium bicarbonate and recovering ammonia gas evolved during said drying.

12. The method as set forth in claim 10, further including the step of washing said precipitated sodium bicarbonate with an aqueous solution of ammonium bicarbonate.

13. The method as set forth in claim 12, said precipitated sodium bicarbonate is retained within said aqueous solution of ammonium bicarbonate at a temperature of between 25° C. and 50° C. for a period of between five minutes and two hours.

14. The method as set forth in claim 13, wherein said temperature is between 35° C. and 40° C.

15. The method as set forth in claim 9, wherein said saturated feedstock of sodium bicarbonate comprises sodium bicarbonate feedstock in deionized water at 100° C.

16. The method as set forth in claim 15, wherein said filtrate liquor is cooled to a temperature of between 30° C. and 70° C.

17. The method as set forth in claim 16, wherein said precipitated sodium bicarbonate is in a size distribution of between −28 mesh and 150 mesh.

18. The method as set forth in claim 17, wherein at least 60% of said size distribution is greater than 60 mesh.

* * * * *